Feb. 24, 1953

A. C. ALLEN ET AL 2,629,458

WATER TRAP FOR AIR LINES

Filed Dec. 8, 1951

Inventors:
Arthur C. Allen
Zdenek J. Lansky

By Ahlberg, Hupper & Gradolph
Attorneys

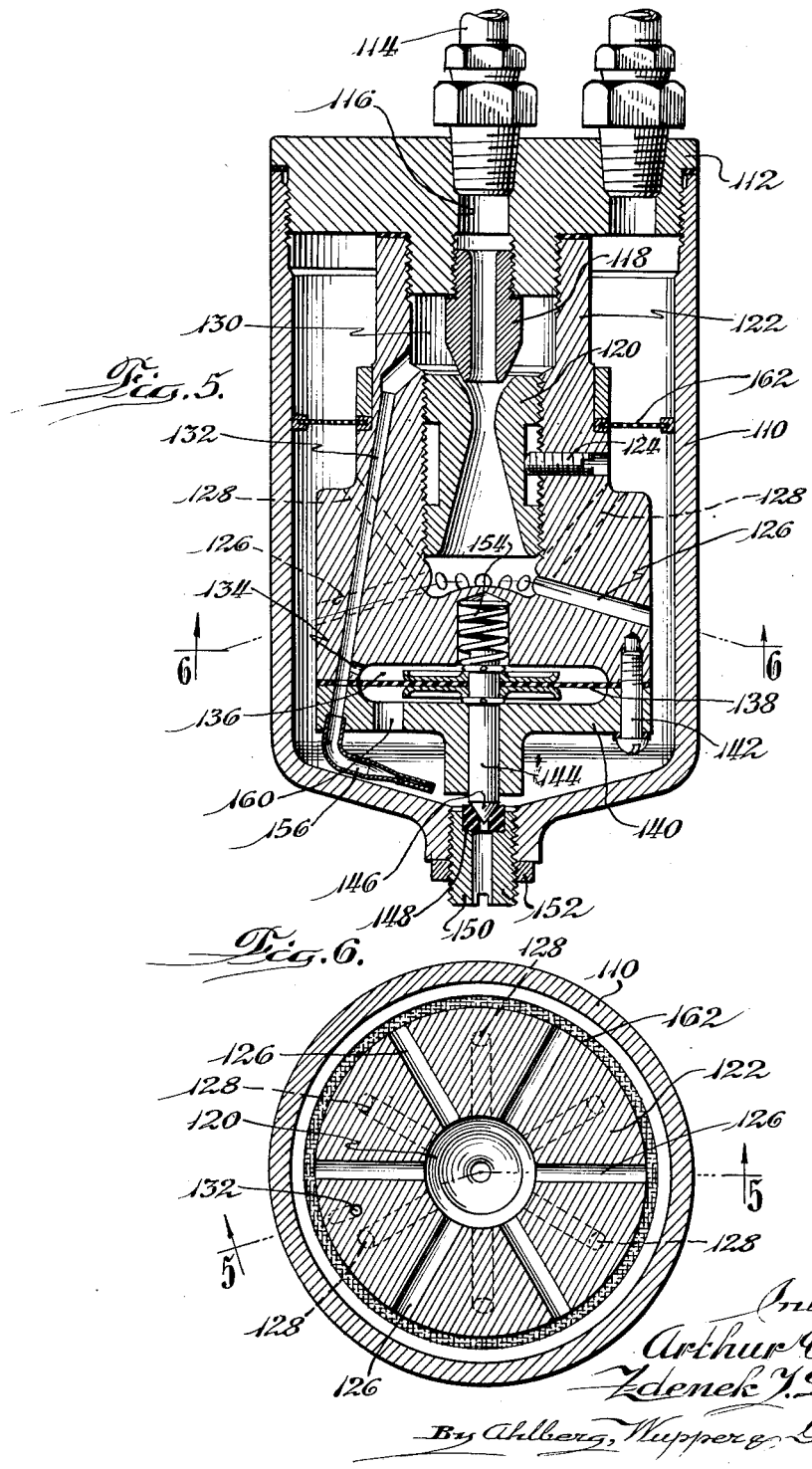

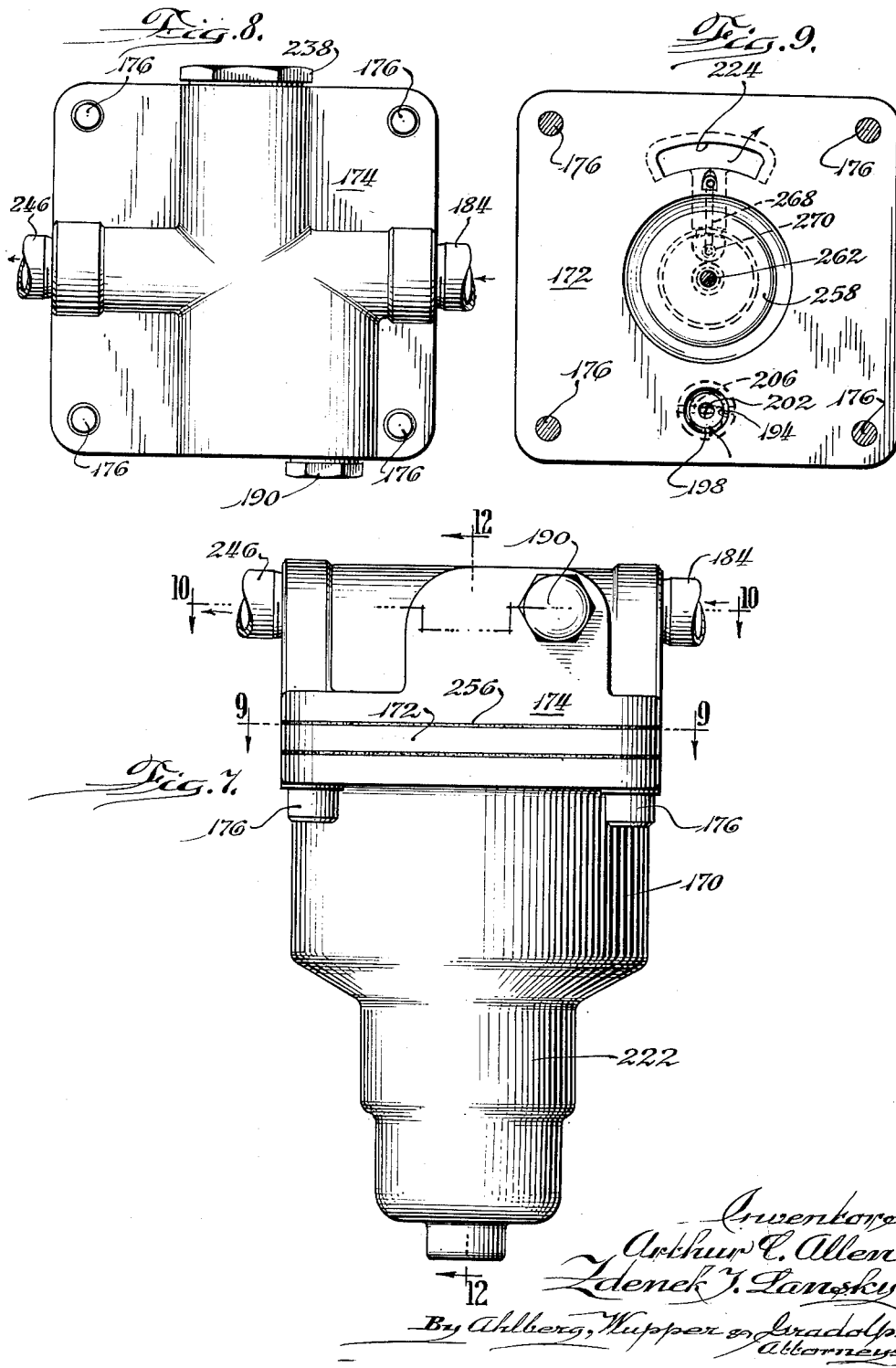

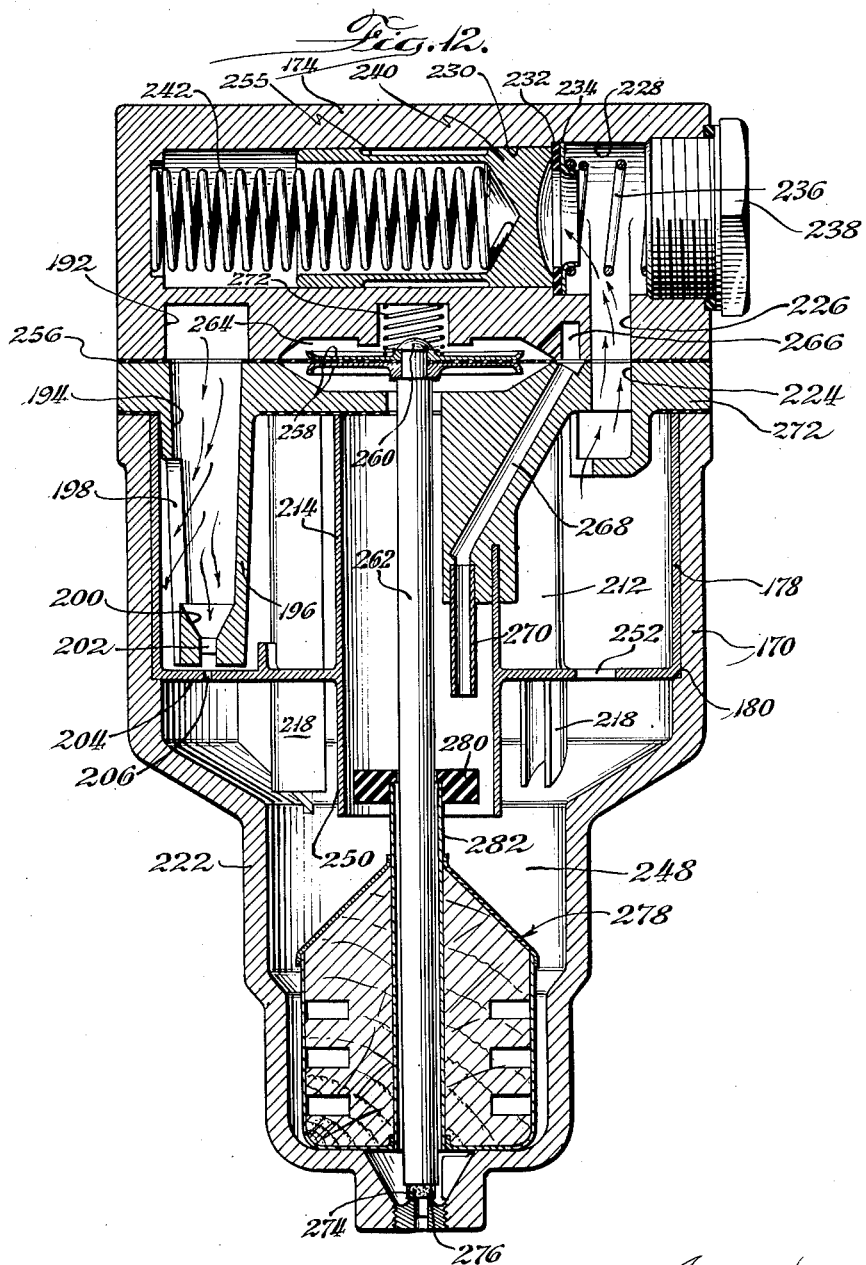

Feb. 24, 1953　　A. C. ALLEN ET AL　　2,629,458
WATER TRAP FOR AIR LINES
Filed Dec. 8, 1951　　7 Sheets-Sheet 7
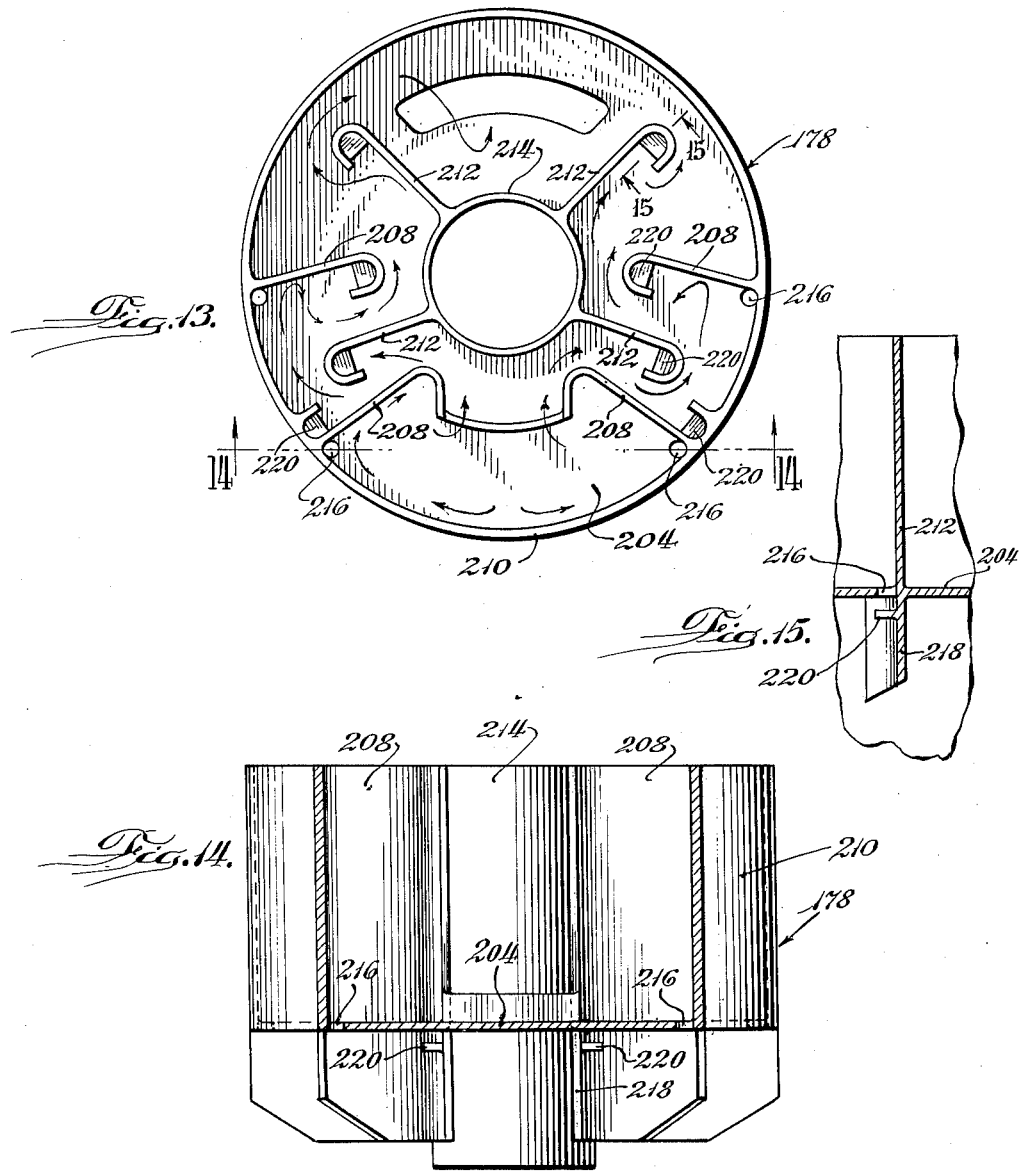

Patented Feb. 24, 1953

2,629,458

UNITED STATES PATENT OFFICE 2,629,458

WATER TRAP FOR AIR LINES

Arthur C. Allen, Chicago, and Zdenek J. Lansky, Cicero, Ill., assignors to Stewart-Warner Corporation, Chicago, Ill., a corporation of Virginia Application December 8, 1951, Serial No. 260,642

22 Claims. (Cl. 183—42)

The present invention relates to water trapping devices, and more particularly to a water trap for removing entrained water and other liquid and solid particles, from air flowing through a compressed air conveying line. The presence of droplets of water, or oil, or particles of other foreign material, such as rust, in compressed air used to operate various types of pneumatic motor driven devices, is harmful to the pneumatic motors, in that the impingement of such particles against the surfaces of the valves, pistons, and cylinders, causes rapid erosion of the parts, and useful life of the motor is thereby substantially reduced.

It is thus the principal object of the invention to provide a new and improved mechanically operating water trap for removing entrained water, oil, and particles of rust from the air flowing through a compressed air conveying line which operates automatically in response to a flow of air in the line.

Another object is to provide a water trap as set forth in the preceding object, which collects the water as it is removed, and which includes means operable automatically to cause the collected water to be forcibly discharged whenever a predetermined amount of removed water collects in the trap.

A still further object of the invention is the provision of a new and improved device for removing water entrained in the air flowing in a compressed air line, which collects the water as it is removed, and which includes means for producing a pressure differential across the device when a predetermined amount of water collects in the trap, and means sensitive to a pressure differential across the device for causing the water to be dumped automatically whenever the predetermined amount of water collects in the trap.

A more general object is to provide a new and improved water trap of the type set forth in the foregoing objects, which is simple and inexpensive in construction, may readily be installed, and which is easy to disassemble and reassemble in case repairs or adjustments are to be made.

Other objects and advantages of the invention will be apparent from the following description, reference being had to the accompanying drawings, in which Fig. 1 is a central vertical section of a water trap of the invention;

Fig. 5 is a vertical sectional view of a modification of the invention, taken on the line 5—5 of Fig. 6;

Fig. 6 is a transverse sectional view, taken on the line 6—6 of Fig. 5;

Fig. 7 is an elevational view of a second modified form of the invention;

Fig. 8 is a plan view thereof;

Fig. 9 is a horizontal sectional view, taken on the line 9—9 of Fig. 7;

Fig. 12 is a central vertical sectional view, taken on the line 12—12 of Fig. 7;

Fig. 13 is a plan view of the baffle section of the water trap;

Fig. 14 is a fragmentary sectional view thereof, taken on the line 14—14 of Fig. 13; and Fig. 15 is a fragmentary sectional view, taken on the line 15—15 of Fig. 13.

Figure 1:
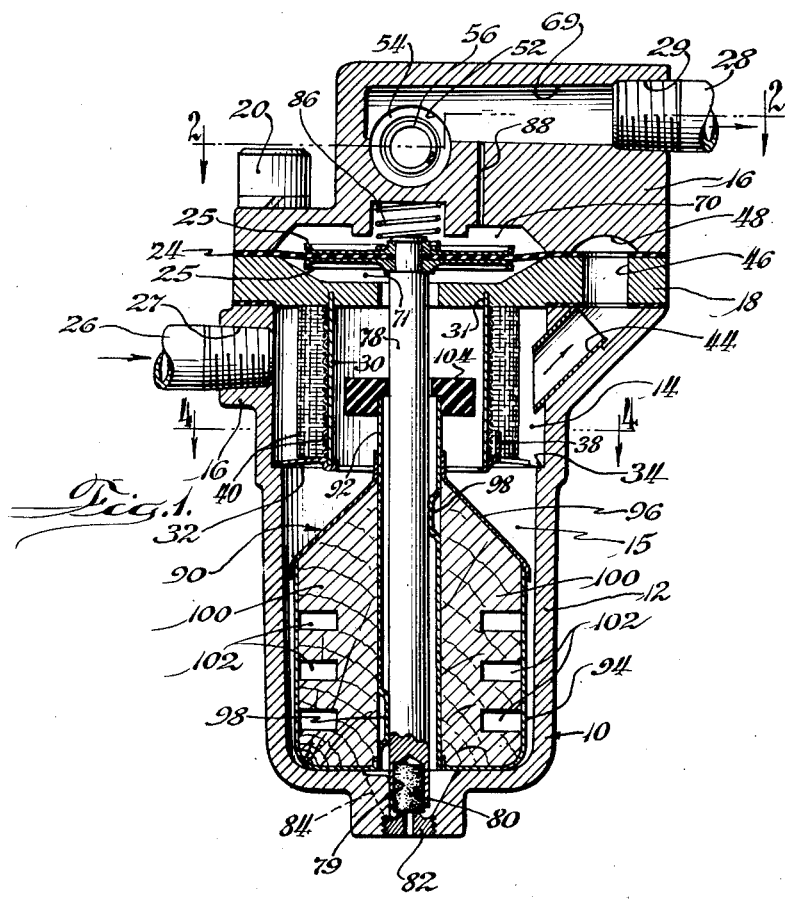
Figure 2:
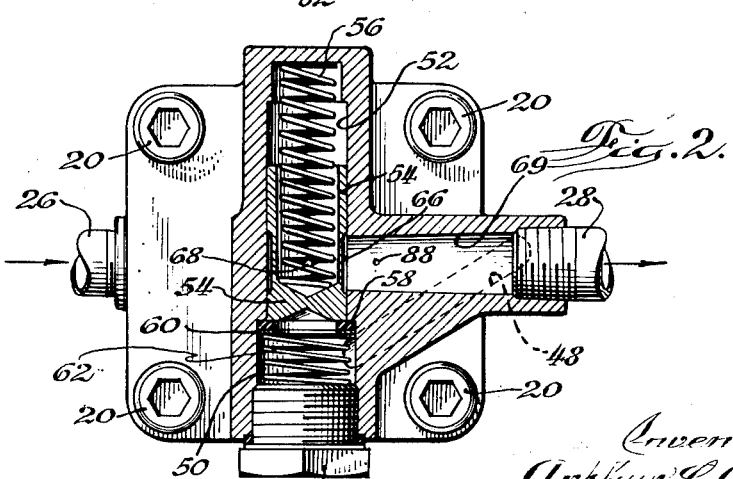
Fig. 2 is a horizontal sectional view, taken on the line 2—2 of Fig. 1.
Figure 3:
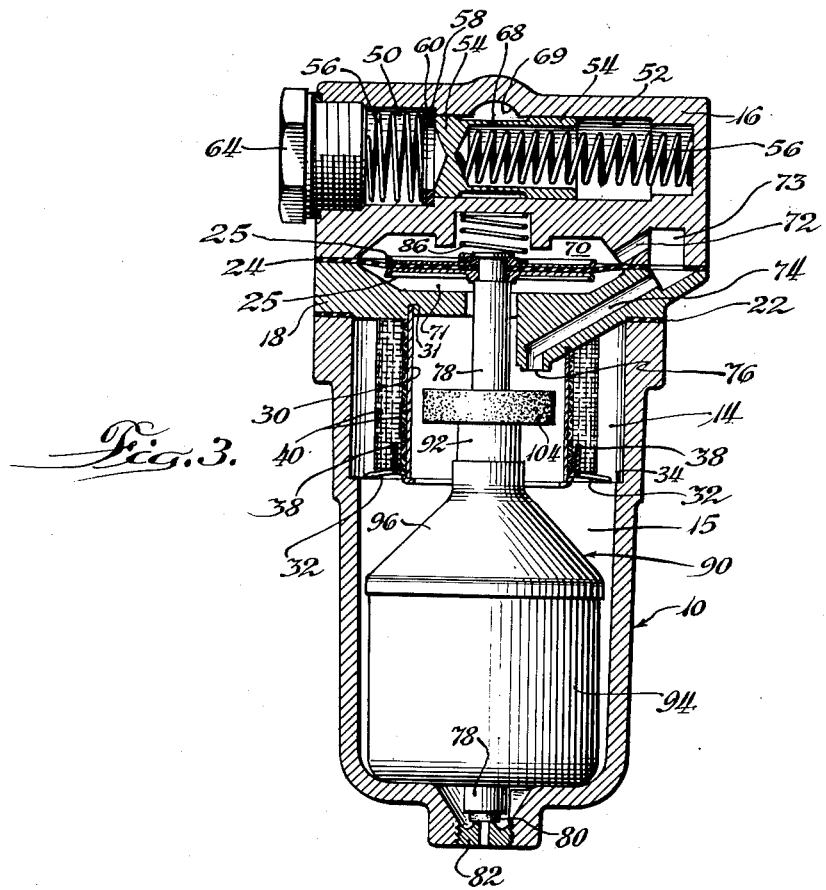
Fig. 3 is a central vertical sectional view of the water trap, taken on a plane at an angle of 90° with respect to the section of Fig. 1.

This application is a continuation in part of our prior application Serial No. 123,928, filed October 27, 1949, now abandoned.

Three embodiments of the invention are disclosed herein. In general, each includes some means for creating a small pressure differential between the air inlet and air outlet of the device, and a horizontal diaphragm, both sides of which are subjected to the same pressure until a certain volume of water has accumulated in a water collecting chamber. Then the means for creating the pressure differential becomes effective to unbalance the pressure on the opposite sides of the diaphragm, and the diaphragm is then flexed. The diaphragm operates a water outlet valve which is raised from its seat when the diaphragm flexes, and entrapped water is thus forced through the water outlet by the air pressure within the device.

The embodiment of the invention shown in Figs. 1 to 4 includes a generally cylindrical body 10, the upper portion of which forms a water separation chamber 14, and the lower portion of which forms a water collecting and float chamber 15. A cap 16 and baffle retainer 18 are secured to the body 12 by cap screws 20. A gasket 22 is interposed between the upper end of the casing 12 and the baffle retainer 18, while the peripheral edge portion of a diaphragm 24 forms a gasket between the cap 16 and baffle retainer 18.

Figure 4:
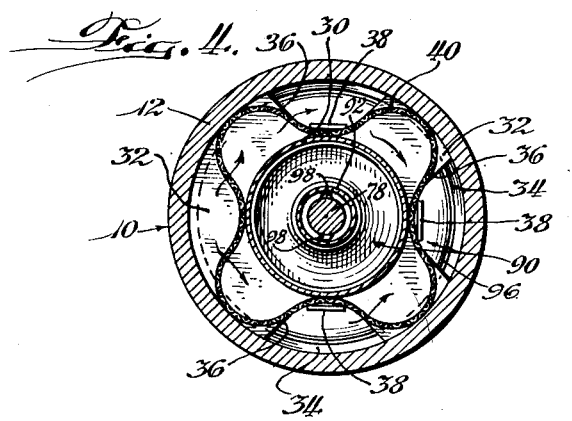
Fig. 4 is a horizontal sectional view, taken on the line 4—4 of Fig. 1.

As shown in Fig. 1, a pipe 26 is threaded in an air inlet opening 27 near the top of the body, and is adapted to be connected to a source of compressed air. An outlet pipe 28 is threaded in an outlet opening 29 in the cap 16, and is connected to the place of use of the dry air. A cylindrical baffle 30 has its upper end projecting into a circular groove 31 in retainer 18, and is suitably secured to a mutilated annular disc 32 which rests upon an internal shoulder 34. As best shown in Fig. 4, the disc 32 has three large arcuate notches 36 spaced at 90° to permit free flow of air between the baffle chamber 14 and the float chamber 15, except adjacent the place at which the air enters the baffle chamber through the pipe 26. Lugs 38 bent upwardly from the annular disc 32 assist in holding a screen 40 against the cylindrical baffle 30, it being noted that the screen is formed in a shape which is sinuous in cross section, so that air entering the inlet will have to pass through this screen several times before it may leave the baffle chamber 14.

An outlet tube 44 (Fig. 1) is die cast in the upper end of the body 10, or is pressed into it. The tube 44 projects downwardly at an angle and a short distance into the baffle chamber 14, so that any water adhering to the wall of the baffle chamber will not be blown through the outlet tube 44, but instead, will gravitate to the float bowl chamber 15.

The outlet tube 44 communicates with a passageway 46 in the retainer 18, and, through a passageway 48, is in free communication with a counterbore 50 formed in the cap 16. The counterbore is in alignment with a bore 52 which forms a cylinder for a plunger valve 54, the latter being hollow and having a relatively long skirt portion enclosing a compressed spiral coil spring 56. The spring 56 normally holds the closed forward end of the valve against a synthetic rubber washer 58, which is held in place by a metallic washer 60 and compressed coil spring 62, the latter being seated against a plug 64 threaded in the counterbore 50. The skirt of the plunger valve 54 has an annular external groove 66 which communicates with the interior of the plunger valve 54 through a small port 68. Thus an outlet passageway 69 is always in limited communication with the bore 52 in which the plunger valve 54 is reciprocable.

The upper surface of the retainer 18, and the lower surface of the cap 16, are conformed to provide suitable chambers 70 and 71 above and below the diaphragm 24. The chamber 71 is at all times in communication with the baffle chamber 14, while the chamber 70 above the diaphragm 24 normally communicates with the baffle chamber through passageways 72, 73 formed in the cap 16, and a passageway 74 formed in the intermediate section 18, the latter passageway terminating at a valve seat 76.

The diaphragm 24 is clamped between two circular plates 25 secured to the reduced diameter upper end portion of a valve stem 78 by upsetting the end of the latter. As shown in Fig. 1, the lower end of the valve stem 78 has an axially drilled socket 79 to receive a synthetic rubber valve plug 80 which is pressed therein. The valve plug 80 cooperates with a valve seat insert 82 at the lower end of the float bowl chamber. The lower end of the valve stem is guided by a plurality of inwardly extending lugs 84 formed integrally with the bottom of the body 10.

The valve 80 is biased toward its seat by a spring 86 compressed between the upper plate 25 and the end of a suitable recess in the cap 16.

The space 70 above the diaphragm communicates with the outlet passageway 69 through a small diameter passageway 88.

A float 90 is freely slidable along the valve rod 78. It is preferably formed of a tube 92 to which a cupped shell 94 and a conical top 96 are soldered. The tube 92 preferably has spaced inwardly projecting portions 98 which bear but lightly against the valve rod 78 to guide the float. An annulus 100 of wood supports the shell 94 and top 96 against collapsing due to the application of air pressure, making it possible to use light gauge sheet metal for the float. The wood is provided with a plurality of holes 102 drilled part way therethrough to provide lightening air spaces. By making these holes 102 more or less in number, the float may have the desired degree of buoyancy and weight. A valve 104 of synthetic rubber or the like, is secured to the upper end of the tube 92 and cooperates with the valve seat 76 at the lower end of the passageway 74 when the float is raised sufficiently due to the presence of a substantial volume of water in the float chamber 15.

In use, the trap is connected in the air line, preferably between the usual compressed storage reservoir and the place at which the compressed air is to be utilized. Whenever the control valve on the tool or other apparatus is opened to permit compressed air to flow from the tank to the tool or apparatus, the air flowing into the trap through the inlet pipe 26 flows around both sides of the baffle 30 through several bights of the screen 36 to the outlet tube 44. In the course of such flow, droplets of water, and any other foreign particles such as rust, will impinge against the wall of the baffle chamber 14 and against the baffle 30, and thus be precipitated from the flowing air. The large particles will be arrested by the screen.

The disentrained water and particles will drop through the three arcuate notches in the disc 32 and collect in the float bowl chamber 15. The fact that the outlet tube 44 projects into the chamber 14 a short distance, prevents water being washed along the wall of the chamber 14 and into the outlet tube. The clean and relatively dry air flows upwardly through passageways 46 and 48 to the counterbore 50, and forces the valve 54 from its seat, and thence flows through the outlet passageway 69 and outlet pipe 28 to the place where the compressed air is being used.

The fact that the air in flowing past the valve operates against the valve spring 56, results in a pressure drop across this valve. The spring is of such strength that this pressure drop is in the order of about two and one-half pounds per square inch. Air will therefore flow from the chamber 70 above the diaphragm 24 through the small duct 88, and this would cause a reduction in pressure on the upper surface of the diaphragm if it were not for the fact that this chamber 70 is in direct communication with the chamber 14 through the relatively large ducts and passageways 72, 73, and 74. The diaphragm therefore remains in the position in which it is shown, with the dump valve 80 maintained on its seat 82 due to the force of the spring 86.

However, when the float valve chamber 15 becomes filled with sufficient water to raise the float 90 to a position in which the valve 104 carried thereby engages its seat 76, air can no longer flow from the inlet to the chamber 70 above the diaphragm 24, and as a result, the pressure in this chamber is rapidly reduced to that of the air in the outlet passageway 69. Since the lower surface of the diaphragm is always subjected to the pressure of the air entering the trap, a differential pressure will exist which will cause the diaphragm to flex upwardly against the force provided by the spring 86, and thus raise the dump valve 80 from its seat 82. The water is thus discharged through the port in the valve seat. This discharge is rapid because the water is under the pressure of the compressed air. As the water is discharged from the float bowl chamber 15, the float will drop and thus pull the valve 104 away from its seat 76. There will be some delay in this action because of the slight differential pressure on the valve 104 over that area represented by the opening in the valve seat 76, and also because of the inertia of the float. As soon as the valve 104 is moved from its seat, a path is again established for the flow of the compressed air from the inlet to the chamber 70 above the diaphragm 24, and the spring 86 will then be effective to snap the dump valve 80 to closed position.

There must be sufficient clearance between the float and the bowl that the float is not appreciably affected by the downward flow of water during the time that it is being discharged.

The hole 68 in the piston valve 54 is provided to prevent the valve from oscillating or "chattering." If the hole 68 were not provided, the air in the bore 52 would be further compressed as the valve moves away from its seat. Under some conditions, the opposing forces acting on the valve 54, due to its inertia and the increase in pressure of the air in the bore 52, would cause the valve to oscillate, with resultant excessive wear and undesirable noise.

In the modification of the invention shown in Figs. 5 and 6, the differential pressure on the valve operating diaphragm is produced by utilizing the reduction in pressure of a Venturi nozzle, and a water flow resistant orifice is used in place of a float. This embodiment comprises a generally cylindrical casing 110 having a cap 112 threaded therein and sealed by a suitable gasket. Compressed air is supplied through a conduit 114 to an inlet bore 116. It then flows through a nozzle 118 directed into the mouth of a Venturi nozzle 120. The latter is threaded in a body 122 which is in turn threaded to the cap 112, the venturi being adjustable in position by rotation and being locked in adjusted position by a set screw 124. The air discharged from the Venturi nozzle 120 flows through a large number of passageways 126 and 128 formed in the body 122. As the air is forced to change the direction of its flow as it leaves the Venturi nozzle, it precipitates water which flows along the walls of the passageway 126, and is carried therefrom with the air flowing through these passageways, and impinges upon the inner wall of the casing 110, flowing down the latter and collecting in the bottom of the casing. The streams of air leaving the passageways 126 and 128 impinge against the inner wall of the housing 110, resulting in separation of additional water from the air.

The aspirating effect of the air flowing through the Venturi nozzle 120 causes a reduced pressure in the chamber 130 surrounding the nozzle 118. This reduction in pressure is communicated through a duct 132 and port 134 to a chamber 136, formed in part by the lower end of the body 122, and in part by a diaphragm 138 which is clamped to the body by a valve guide 140, which in turn is secured to the body by screws 142.

The diaphragm 138 is suitably secured to a valve stem 144 which has a conical end 146 forming a valve cooperable with a synthetic rubber valve seat 148. The valve seat is secured in a tubular screw 150 threaded in the lower end of the casing 110 and locked in adjusted position by a nut 152. The valve is urged toward closed position by a compressed coil spring 154. A tube 156 is secured in the valve guide 140 and communicates with the duct 132. The end of the tube 156 is elongated and of reduced section so as to provide a restriction through which air may flow rather freely, but which will afford sufficient resistance to the flow of water that a differential pressure may be obtained on the opposite sides of the diaphragm 138. It will be noted that the lower surface of the diaphragm is in communication with the space at the bottom of the casing through one or more openings 160 in the valve guide plate 140.

An annular screen 162 is preferably secured across the space between the inside of the casing and the body 122 to filter out the larger foreign particles.

The pressure in chamber 136 above the diaphragm 138 is normally maintained substantially the same as that on the lower surface of the diaphragm, because air may flow freely through the restriction tube 156 and thence through a portion of the duct 132 and port 134. Or, stated differently, the reduction in pressure due to the aspirating effect of the Venturi nozzle 120, does not reduce the pressure in chamber 136 very much, because air may flow through the tube 156 and duct 132, to the chamber 130, at a rate sufficient to replace the air which is aspirated from this chamber. However, when the level of the water accumulated in the bottom of the casing 110 rises above the end of the tube 156, the water will commence flowing through one tube restriction, but the resistance to flow of the water, due to the small diameter of this tube, will be such as to cause a reduction in pressure in the chamber 136. As a result, the air pressure acting on the lower surface of the diaphragm flexes the latter upwardly against the force applied thereto by the spring 154, and opens the valve 146, permitting the collected water to be discharged through the tubular screw 150.

After the water level drops below that of the end of the tube 156, air will again flow through this tube and duct 132 to the chamber 130, to replace the air withdrawn therefrom due to the suction created by the Venturi tube 120, and air will also flow through the port 134 into the chamber 136 above the diaphragm, again substantially equalizing the pressures on the opposite sides of the diaphragm, and permitting the spring 154 to move the valve 146 to closed position.

It will be apparent that the embodiment of the invention shown in Figs. 5 and 6 is similar to the previously described embodiment, in that the dump valve is opened by creating a difference in air pressure on the opposite sides of a diaphragm, and that in each form of the invention the presence of an accumulation of water precipitated from the compressed air is employed to create this pressure differential. In both forms of the invention, the air is projected against walls or baffles so that the droplets of water entrained therein will, due to their inertia, be impacted against the surface of the baffle or wall, adhere thereto, and run down the walls into a collecting chamber.

When the water trap is to be of larger capacity, it is preferably made in the form shown in Figs. 7 to 15.

Figure 10:
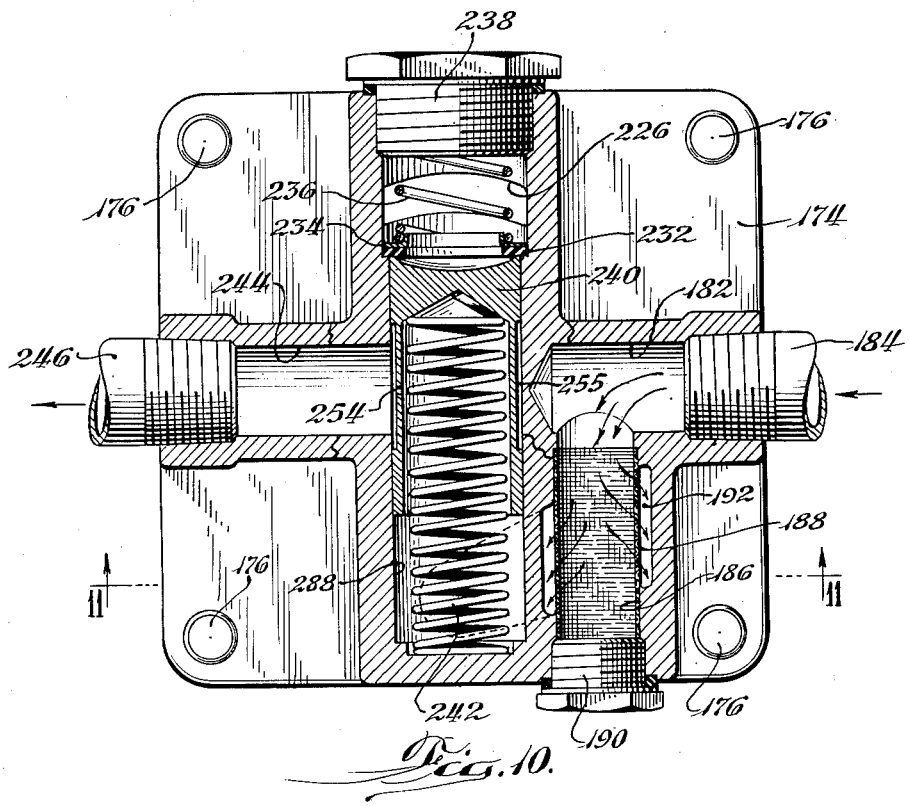
Fig. 10 is a horizontal sectional view, taken on the line 10—10 of Fig. 7.

As best shown in Fig. 12, the water trap has a casing 170, an intermediate section 172, and a cap 174 secured together by cap screws 176 (Fig. 7). A baffle structure 178 is secured within the casing, this structure resting on a shoulder 180 within the upper portion of the casing 170. The cap 174 has an inlet passageway 182 for connection to a compressed air supply pipe 184 (Fig. 10). A transverse bore 186 communicates with the bore 182 and contains a cylindrical filtering screen 188 held in place by a plug 190 threaded in the end of the bore.

Figure 11:
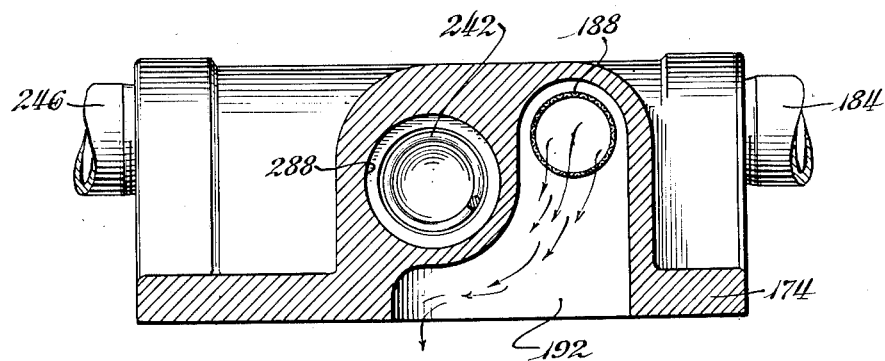
Fig. 11 is a vertical sectional view, taken on the line 11—11 of Fig. 10.

As best shown in Figs. 10 and 11, air flowing through the screen 188 enters a passageway 192 (Fig. 11), which is in direct communication with a downwardly extending passageway 194 (Fig. 12), formed in the intermediate section 172, particularly by a depending partial tube 196 which has a large elongated opening 198 therein, and which terminates in a portion defining a conical nozzle 200 leading into a small port 202. Air flowing through this port impinges against a horizontal separator wall 204 which has a small port 206 therein for permitting the escape of water which may collect along the upper surface of the separating wall 204 and which may be precipitated from the air flowing through the port 202.

The main body of the air is deflected, as best shown by the arrows in Fig. 13, by a series of vertical baffles 208 which extend inwardly from the cylindrical wall 210 of the baffle structure, and by a plurality of similar baffles 212 which extend outwardly from the hollow cylindrical core 214 of the baffle structure. All of the baffles 208 and 212, except those nearest the inlet opening 198, have end portions which are hook-like in cross section and have small openings 216 in the horizontal separating wall 204.

As best shown in fragmentary section in Fig. 15, there is an extension 218 of the baffle wall 212, and directly beneath the opening 216 there is a shelf 220 which provides an additional surface upon which any air flowing through the opening 216 may impinge. The hole 216, of course, provides a means for conveying the water, which collects upon and flows along the surfaces of the baffle, to enter the float bowl portion 222 of the casing 170. The main stream of air, after flowing past the baffles 208 and 212, passes from the interior of the baffle structure 178 through a suitably baffled arcuate outlet port 224 and through a similar port 226 in the cap 174, into a counterbore 228. The counterbore has a smaller diameter bore 230 in axial alignment therewith, and a synthetic rubber valve seat 232 is pressed against the shoulder between the counterbore 228 and the bore 230, by a backing washer 234 and a spring 236, the latter being seated against a plug 238 threaded in the counterbore 228.

A plunger valve 240 is reciprocable in the bore 230 and is urged toward the valve seat 232 by a compression coil spring 242. This spring has a strength such that there will be approximately a two and one-half pounds per square inch pressure drop across the valve when it is forced from its seat and as air is flowing past it. After passing the valve 240, the air flows into an outlet passageway 244 into which an outlet pipe 246 is threaded. It will be noted that the outlet pipe 246 is in axial alignment with the inlet pipe 184. This facilitates connecting the trap in a compressed air pipe line.

Some of the air flow through the baffle structure is by way of the small openings 216 and the opening 206 into the float valve chamber 248, where it impinges against baffles 218 which depend from the horizontal wall 204, and are generally of the same configuration as the upwardly extending baffles 208, 212, and 216, except that these baffles are much shorter. The hollow cylindrical core 214 also has a downwardly extending baffle extension 250. The air which flows into the float bowl chamber 248 passes therefrom through an arcuate outlet port 252.

The bore 230 is always in communication with the outlet passageway 244 through a minute port 254 in its side wall and an annular groove 255. The port 254 may be approximately one-sixteenth inch in diameter, and as previously described, prevents oscillation of the valve under certain conditions of operation.

A diaphragm 256 of flexible synthetic rubber is clamped between the intermediate section 172 and the cap 174, and has a pair of slightly dished backing plates 258 clamped around its central portion by the rivet-like head 260 on the reduced diameter end portion of a valve stem 262. A chamber 264 above the diaphragm communicates with the space within the core 214 through an elbow-shaped passageway 266 in the cap 174, and a diagonal passageway 268 formed in a downward extension of the intermediate section 172. A tube 270 is secured at the lower end of the passageway 268. The diaphragm is pressed downwardly by a compressed coil spring 272.

The lower end of the valve stem 262 is hollowed out (in the same manner as more clearly illustrated in Fig. 1), to receive a rubber plug valve 274 which engages a valve seat 276 formed as an insert threaded into the bottom of the float bowl portion 222 of the casing 170. A float 278, constructed in the same manner as described with reference to the float shown in Fig. 1, is freely slidable on the valve rod 262 and has a synthetic rubber valve disc 280 secured to the upper end of the central tube 282 of the float. This valve disc 280 cooperates with the end of the tube 270 to close off communication between the float bowl 248 and the chamber 264 above the diaphragm 256 when a predetermined amount of water has accumulated within the float bowl chamber.

The operation of the modification shown in Figs. 7 to 15 is similar to that form of the invention shown in Figs. 1 to 4. Due to its larger size, more baffling means may be included so that there are more reversals of the direction of flow of the air as it passes from the inlet to the outlet, and there is a greater surface area upon which the moisture will collect. It is desirable to make the water separator relatively large, taking into consideration the increase of cost with size. The traps shown herein are approximately to scale (in the application drawings), but they may be made larger, and possibly somewhat smaller, if desired.

While we have shown and described preferred embodiments of our invention, it will be apparent that numerous variations and modifications thereof may be made without departing from the underlying principles of the invention. We therefore desire, by the following claims, to include within the scope of the invention all such variations and modifications by which substantially the results of our invention may be obtained through the use of substantially the same or equivalent means.

We claim:

1. A device for removing water from a compressed air line comprising a hollow casing having an inlet and an outlet for air under pressure, an impact surface in said casing against which the air flowing from said inlet to said outlet impinges to precipitate water entrained therein, the lower portion of said casing forming a trap for collecting precipitated water, means forming an outlet in the lowermost portion of said casing for discharging collected water, a dump valve to control flow through said water outlet, a diaphragm to open said valve, means forming a chamber to isolate one side of said diaphragm from the pressure in said casing, means to establish a pressure differential between said air inlet and outlet in response to a flow of air between said points, said means communicating with said isolating chamber, means forming a passageway through which air circulates from said casing to said isolating chamber and said pressure differential producing means to equalize the pressure on opposite sides of said diaphragm, and means to close communication through said passageway in response to a predetermined rise in the level of the water in said casing to render said diaphragm operative to open said valve.

2. A device for removing water from a compressed air line comprising a hollow casing having an inlet and an outlet for air under pressure, an impact surface in said casing against which the air flowing from said inlet to said outlet impinges to precipitate water entrained therein, the lower portion of said casing forming a trap for collecting precipitated water, means forming an outlet in the lowermost portion of said casing for discharging collected water, a dump valve to control flow through said water outlet, a diaphragm to open said valve, means forming a chamber to isolate one side of said diaphragm from the pressure in said casing, means to establish a pressure differential between said air inlet and outlet in response to a flow of air between said points, said means communicating with said isolating chamber, means forming a passageway through which air circulates from said casing to said isolating chamber and pressure differential producing means to equalize the pressure on opposite sides of said diaphragm, and means to close communication through said passageway in response to a predetermined rise in the level of the water in said casing to render said diaphragm operative to open said valve, the lower portion of said casing being in communication with the portion of the casing through which air flows so that the water collected in the casing is forcibly ejected by the air under pressure in the casing when the dump valve opens.

3. A device for removing water from a compressed air line, comprising a hollow casing having an inlet and an outlet for air under pressure, an impact surface in the casing against which the air flowing from the inlet to the outlet impinges for precipitating water entrained in the air, a portion of the casing forming a trap to collect precipitated water, a water outlet for discharging collected water, a dump valve to control flow through the water outlet, means forming a chamber in the casing, fluid pressure sensitive means having a movable wall connected to the dump valve and dividing the chamber into two portions, means to establish a presure differential between the two portions of the chamber when air flows through the trap from the inlet to the outlet, means forming a passage connecting the two portions of the chamber to relieve the pressure differential to prevent the movable wall from opening the dump valve, and means to close the passage in response to a predetermined rise in the level of the water in the casing to render the fluid pressure sensitive means operative to open the dump valve.

4. A device for removing water from a compressed air line comprising a hollow casing having an inlet and an outlet for air under pressure, an impact surface in said casing against which the air flowing from said inlet to said outlet impinges to precipitate water entrained therein, the lower portion of said casing forming a trap for collecting precipitated water, means forming an outlet in the lowermost portion of said casing for discharging collected water, a dump valve to control flow through said water outlet, a diaphragm in said casing for operating said valve, one side of said diaphragm being isolated from the interior of said casing and the other side being constantly subject to the pressure in the casing, and means to establish a pressure drop upon the isolated side of said diaphragm in response to a flow of air between said air inlet and outlet and a predetermined rise in the level of the water in said casing for rendering said diaphragm operative to open said valve.

5. A water trap as defined in claim 4, wherein said diaphragm is disposed in a plane extending transversely of the casing above said water outlet, and said dump valve is of the poppet type and has a stem extending axially of the casing and directly connected to the center portion of said diaphragm.

6. A device for removing water from a compressed air line comprising a hollow casing having an inlet and an outlet for air under pressure, an impact surface in said casing against which the air flowing from said inlet to said outlet impinges for precipitating water entrained in the air, a portion of said casing forming a trap to collect precipitated water, an outlet for discharging collected water, a dump valve to control flow through said discharge outlet, fluid pressure sensitive means having a movable wall connected to said valve, a chamber in said casing for said pressure sensitive means, means to create a pressure drop in response to a flow of air between said air inlet and outlet, said means communicating with said chamber, passageway forming means for the flow of air from the interior of said casing to said chamber to compensate for pressure drop therein, and a valve to close communication between said casing and chamber in response to a predetermined rise in the level of the water in said casing whereby a drop in the pressure in the chamber is effected sufficient to render the pressure sensitive means operative to open said dump valve.

7. A device for removing water from a compressed air line comprising a hollow casing having an inlet and an outlet for air under pressure, an impact surface in said casing against which the air flowing from said inlet to said outlet impinges for precipitating water entrained in the air, a portion of said casing forming a trap to collect precipitated water, an outlet for discharging collected water, a dump valve to control flow through said discharge outlet, means to establish a pressure differential between said air inlet and outlet when air flows between said points, fluid pressure sensitive means having a movable wall connected to said dump valve and operative in response to a pressure differential between said air inlet and outlet to open said dump valve, passageway forming means through which air from said casing circulates to compensate for pressure differential tending to operate said pressure sensitive means, a valve to close communication through said passageway, and a float to move said last mentioned valve to operative position in response to a predetermined rise in the level of the water in said casing whereby the pressure differential between said inlet and outlet renders the pressure sensitive means operative to open said dump valve.

8. A device for removing water from a compressed air line comprising a hollow casing having an inlet and an outlet for air under pressure, means in the path of flow of air from said inlet to said outlet for precipitating water entrained in the air, a portion of said casing forming a trap to collect precipitated water, a discharge outlet for collected water, a dump valve to control flow through said discharge outlet, a valve chamber in the path of flow of air from said air inlet to said outlet, a check valve in said chamber biased to close communication between said inlet and outlet whereby a pressure differential is established between the inlet and outlet, fluid pressure sensitive means including a movable wall connected to said dump valve and operative in response to a pressure differential between said air inlet and outlet to open said dump valve, passageway forming means through which air from the casing circulates to equalize pressure differential tending to operate said pressure sensitive means, and a valve to close communication through said passageway forming means in response to a predetermined rise in the level of the water in said casing whereby the pressure differential between said air inlet and outlet renders the pressure sensitive means operative to open said valve.

9. A water trap as defined in claim 8, wherein a float is provided in the lower end of said casing to move the last mentioned valve to operative position in response to a predetermined rise in the level of the water in the casing.

10. A device for removing water from a compressed air line comprising a hollow casing having an inlet and an outlet for air under pressure, means to create a pressure drop in response to a flow of air from said inlet to said outlet, an impact surface against which air flowing from said inlet to said outlet impinges to precipitate the water entrained therein, the lower portion of said casing forming a trap for collecting precipitated water, a discharge outlet in the lowermost portion of the casing, a valve to control flow through said discharge outlet, fluid pressure sensitive means including a movable wall connected to said valve, means to communicate a pressure drop between said air inlet and outlet to said pressure sensitive means for rendering said movable wall operative to open said valve, and means forming a passageway for the circulation of air from said casing to compensate for pressure drop created by a flow of air between said air inlet and outlet having an inlet adjacent the water outlet small enough to be closed for an interval sufficient to render the pressure sensitive means operative to open said valve when a slug of water enters the inlet.

11. A device for removing water from a compressed air line as defined in claim 10, wherein the means to create a pressure drop includes a tubular body member and a venturi for creating a pressure drop in said tubular body member when air flows from said inlet to said outlet, and a nozzle to direct air from said inlet into the throat of said venturi spaced closely adjacent the mouth of the venturi.

12. A device for removing water from a compressed air line comprising a hollow casing having an inlet and an outlet for air under pressure, means to create a pressure drop in response to a flow of air from said inlet to said outlet, a surface in said casing against which air flowing from said inlet to said outlet impinges to precipitate water entrained in the air, the lower portion of said casing forming a trap for collecting precipitated water, a valve controlled discharge outlet in said lowermost portion of the casing, a diaphragm to control opening and closing of said valve controlled outlet, means forming a chamber for said diaphragm in constant communication with the interior of the casing on one side of the diaphragm, means to communicate to the chamber on the second side of said diaphragm the pressure drop created in response to a flow of air from said inlet to said outlet, and passageways normally effective to maintain a state of pressure equilibrium in the chamber on the two sides of the diaphragm including a passageway to establish communication between the interior of the casing and the chamber on the second side of said diaphragm having an inlet at the water collecting region of the casing of dimensions small enough to be closed by water entering the same whereby a pressure drop is created at the second side of the diaphragm effective to open said valve when the water in the casing rises high enough to enter said inlet.

13. A device for removing water from a compressed air line comprising a hollow casing having an inlet and an outlet for air under pressure, a generally tubular body member in said casing, means in said tubular body member to receive air under pressure from said inlet including means to create a pressure drop in said tubular body member in response to a flow of air from said inlet to said outlet and an impact surface against which air impinges to precipitate water entrained therein, the lower portion of said casing forming a trap for collecting water, a plurality of passageways in said tubular body member to convey air impinging on said surface and precipitated water to the interior of said casing, a discharge outlet in the lowermost portion of said casing, a valve to control flow through said discharge outlet, a diphragm connected to said valve, one side of said diaphragm being isolated from said casing and the other side being constantly subject to the pressure in said casing, passageways formed in said tubular body member to communicate the pressure drop in said tubular body member to the isolated side of said diaphragm for rendering the latter operative to open said valve, and means forming a passageway for the circulation of air from the interior of said casing to compensate for pressure drop in said tubular body member, said passageway forming means having an inlet in the lower portion of said casing small enough to be closed by a slug of water entering the same temporarily to block flow of compensating air from the casing when the water in said casing rises to the level of said inlet.

14. A device for removing water from a compressed air line comprising a hollow casing having an inlet and an outlet for air under pressure, an impact surface in said casing against which the air flowing from said inlet to said outlet impinges to precipitate water entrained therein, the lower portion of said casing forming a trap for collecting precipitated water, means forming an outlet in the lowermost portion of said casing for discharging collected water, a dump valve to control flow through said water outlet, a movable wall in said casing for operating said valve, one side of said wall being substantially isolated from the interior of said casing and the other side being constantly subject to the pressure in the casing, means responsive to flow of air from the inlet to the outlet to cause the pressure at the outlet to be less than the pressure at the inlet, a small diameter passageway connecting the outlet to the side of the movable wall which is isolated from the chamber, a larger diameter passageway connecting the interior of the casing to the isolated side of the movable wall, and means responsive to a predetermined rise in the level of the water in said casing to close said large diameter passageway thereby rendering said diaphragm operative to open said valve.

15. The combination set forth in claim 14, wherein said movable wall is disposed in a plane extending transversely of the casing above said water outlet, and said dump valve is of the poppet type and has a stem extending axially of the casing and directly connected to the center portion of said movable wall.

16. The combination set forth in claim 14, in which the dump valve is biased to remain in closed position by a spring, and has a stem connecting it to the movable wall, and in which a float is freely slidable on the valve stem and carries a valve to close the end of the larger diameter passageway.

17. A device for removing water from a compressed air line comprising a hollow casing having an inlet and an outlet for air under pressure, means in said casing providing an impact surface against which the air flowing from said inlet to said outlet impinges to precipitate water entrained therein, the lower portion of said casing forming a trap for collecting precipitated water, means forming an outlet in the lowermost portion of said casing for discharging collected water, a dump valve to control flow through said water outlet, a movable wall in said casing for operating said valve, one side of said wall being substantially isolated from the interior of said casing and the other side being constantly subject to the pressure in the casing, means forming a cylinder having one end connected to the interior of the casing and having its other end connected to the outlet, a piston reciprocable in the cylinder, a spring biasing the piston to move to a position in which it prevents flow of air from the casing to the outlet, thereby to cause the pressure at the outlet to be less than the pressure in the interior of the casing, a small diameter passageway connecting the outlet to the side of the movable wall which is isolated from the chamber, a larger diameter passageway connecting the interior of the casing to the isolated side of the movable wall, and means responsive to a predetermined rise in the level of the water in said casing to close said large diameter passageway thereby rendering said diaphragm operative to open said valve.

18. A device for removing water from a compressed air line comprising a hollow casing having an inlet and an outlet for air under pressure, an impact surface in said casing against which the air flowing from said inlet to said outlet impinges to precipitate water entrained therein, the lower portion of said casing forming a trap for collecting precipitated water, means forming an outlet in the lowermost portion of said casing for discharging collected water, a dump valve to control flow through said water outlet, a diaphragm in said casing, a stem connecting the diaphragm to the valve, one side of said diaphragm being substantially isolated from the interior of said casing and the other side being constantly subject to the pressure in the casing, means responsive to flow of air from the inlet to the outlet to cause the pressure at the outlet to be less than the pressure at the inlet, a relatively restricted passageway connecting the outlet to the side of the diaphragm which is isolated from the chamber, a relatively unrestricted passageway connecting the interior of the casing to the isolated side of the diaphragm, and means responsive to a predetermined rise in the level of the water in said casing to close said diameter passageway thereby rendering said diaphragm operative to open said valve.

19. A device for removing water from a compressed air line comprising a hollow casing having an inlet and an outlet for air under pressure, a baffle structure in said casing against which the air flowing from said inlet to said outlet impinges to precipitate water entrained therein, said baffle structure including a horizontal wall having openings therein, the portion of said casing below the horizontal wall of the baffle structure forming a trap for collecting precipitated water, means forming an outlet in the lowermost portion of said casing for discharging collected water, a dump valve to control flow through said water outlet, a movable wall in said casing for operating said valve, one side of said wall being substantially isolated from the interior of said casing and the other side being constantly subject to the pressure in the casing, means including a spring loaded valve opened in response to flow of air from the inlet to the outlet to cause the pressure at the outlet to be less than the pressure at the inlet, a passageway of small cross sectional area connecting the outlet to the side of the movable wall which is isolated from the chamber, a passageway of relatively large cross sectional area connecting the interior of the casing to the isolated side of the movable wall, and means responsive to a predetermined rise in the level of the water in said casing to close said large passageway thereby rendering said movable wall operative to open said valve.

20. In a device for removing water from the air flowing through a compressed air line, the combination of a cuplike housing forming a float chamber at its bottom, an integral baffle section secured in the upper portion of said casing and providing a plurality of baffle walls against which air flowing through the upper portion of the casing must impinge, thereby to precipitate water entrained therein, an intermediate section having portions extending into the upper portion of the housing, said intermediate section having inlet and outlet passageways for the flow of air into and from the upper portion of the casing, a head having aligned air inlet and outlet ports, means for securing the head and intermediate section to the casing, means forming a passageway connecting the inlet port to the inlet passageway in the intermediate section, a cylindrical bore in said head, a piston valve reciprocable in said bore, a spring biasing said piston valve to closed position, means forming a passageway connecting the outlet passageway of the intermediate section to the cylinder, said piston valve offering a resistance to flow of air from said last named passageway to the outlet and thereby causing a pressure drop whenever air is flowing past it to the outlet, a diaphragm secured between the head and the intermediate section, means providing free communication between the interior of the casing and the lower side of said diaphragm, a dump valve at the lower end of the casing, a stem connecting the diaphragm to the dump valve, a spring biasing the dump valve to closed position, a relatively unrestricted passageway connecting the interior of the casing with the space above the diaphragm, a relatively restricted passageway connecting the space above the diaphragm to the outlet, a float reciprocable on said valve stem, and a valve carried by the float and operable to close said relatively unrestricted passageway whenever a predetermined quantity of water has accumulated in the float chamber.

21. In a device for removing water from air flowing through a compressed air line, the combination of a cuplike housing forming a float chamber at its bottom, an integral baffle section secured in the upper portion of said casing and providing a plurality of baffle walls against which air flowing through the upper portion of the casing must impinge, thereby to precipitate water entrained therein, an intermediate section having portions extending into the upper portion of the housing, said intermediate section having inlet and outlet passageways for the flow of air into and from the upper portion of the casing, a head having aligned air inlet and outlet ports, means for securing the head and intermediate section to the casing, a passageway in said head connecting the inlet to the inlet passageway in the intermediate section, means in said head to cause a pressure drop whenever air is flowing to the outlet, a diaphragm secured between the head and the intermediate section, means providing free communication between the interior of the casing and the lower side of said diaphragm, a dump valve at the lower end of the casing, a stem connecting the diaphragm to the dump valve, a spring biasing the dump valve to closed position, a relatively unrestricted passageway connecting the interior of the casing with the space above the diaphragm, a relatively restricted passageway connecting the space above the diaphragm to the outlet, a float reciprocable on said valve stem, and a valve carried by the float and operable to close said relatively unrestricted passageway whenever a predetermined quantity of water has accumulated in the float chamber.

22. In a device for removing water from the air flowing through a compressed air line, the combination of a cuplike housing forming a float chamber at its bottom, an intermediate section having portions extending into the upper portion of the housing, said intermediate section having inlet and outlet passageways for the flow of air into and from the upper portion of the casing, a head having inlet and outlet ports, means for securing the head and intermediate section to the casing, means forming a passageway connecting the inlet to the inlet passageway in the intermediate section, means to cause a pressure drop whenever air is flowing to the outlet, a diaphragm secured between the head and the intermediate section, means providing free communication between the interior of the casing and the lower side of said diaphragm, a dump valve at the lower end of the casing, a stem connecting the diaphragm to the dump valve, a spring biasing the dump valve to closed position, a relatively unrestricted passageway connecting the interior of the casing with the space above the diaphragm, a relatively restricted passageway connecting the space above the diaphragm to the outlet, a float reciprocable on said valve stem, and a valve carried by the float and operable to close said relatively unrestricted passageway whenever a predetermined quantity of water has accumulated in the float chamber.

ARTHUR C. ALLEN.
ZDENEK J. LANSKY.

REFERENCES CITED

The following references are of record in the file of this patent:

UNITED STATES PATENTS

| Number | Name | Date |
|---|---|---|
| 548,458 | Reynolds | Oct. 22, 1895 |
| 670,893 | Donnelly | Mar. 26, 1901 |
| 1,355,746 | Justus | Oct. 12, 1920 |

FOREIGN PATENTS

| Number | Country | Date |
|---|---|---|
| 14,797 | Great Britain | June 19, 1914 |